US009026308B2

United States Patent
Gordh et al.

(10) Patent No.: US 9,026,308 B2
(45) Date of Patent: May 5, 2015

(54) SYSTEM FOR CONTROLLING DRIVING MODES OF A VEHICLE

(71) Applicant: Volvo Car Corporation, Goeteborg (SE)

(72) Inventors: Mikael Gordh, Ytterby (SE); Risto Vahtra, Goeteborg (SE)

(73) Assignee: Volvo Car Corporation, Gothenburg (SE)

( * ) Notice: Subject to any disclaimer, the term of this patent is extended or adjusted under 35 U.S.C. 154(b) by 232 days.

(21) Appl. No.: 13/721,640

(22) Filed: Dec. 20, 2012

(65) Prior Publication Data

US 2013/0166100 A1 Jun. 27, 2013

(30) Foreign Application Priority Data

Dec. 21, 2011 (EP) ..................................... 11194960

(51) Int. Cl.
*G06F 7/00* (2006.01)
*B60W 30/182* (2012.01)
*B60W 50/08* (2012.01)
*B60K 37/06* (2006.01)
*G06F 3/0482* (2013.01)
*B60W 30/14* (2006.01)
*B60W 30/16* (2012.01)
*B60W 50/00* (2006.01)

(52) U.S. Cl.
CPC .......... *B60W 30/182* (2013.01); *B60W 50/082* (2013.01); *B60K 37/06* (2013.01); *B60W 30/143* (2013.01); *B60W 30/16* (2013.01); *G06F 3/0482* (2013.01); *B60K 2350/928* (2013.01); *B60W 2550/308* (2013.01); *B60K 2350/1096* (2013.01); *B60K 2350/962* (2013.01); *B60W 2050/0063* (2013.01); *B60W 2050/0075* (2013.01)

(58) Field of Classification Search
USPC ...................... 701/1, 36, 41, 93, 96, 116, 538
See application file for complete search history.

(56) References Cited

U.S. PATENT DOCUMENTS

| 5,230,400 | A | * | 7/1993 | Kakinami et al. ............ 180/169 |
| 2003/0023353 | A1 | | 1/2003 | Badarneh |
| 2010/0250066 | A1 | * | 9/2010 | Eckstein et al. ................ 701/41 |

FOREIGN PATENT DOCUMENTS

| DE | 10212781 | 10/2003 |
| DE | 102006060554 | 6/2008 |
| EP | 1762421 | 3/2007 |
| WO | 01/60650 | 8/2001 |

OTHER PUBLICATIONS

Extended European Search Report for 11194960.8 dated May 14, 2012.

* cited by examiner

*Primary Examiner* — Kim T Nguyen
(74) *Attorney, Agent, or Firm* — Brooks Kushman P.C.

(57) ABSTRACT

A system for controlling driving modes of a vehicle having a driver, where each of the driving modes is adapted to control a behavior of the vehicle during operation of the vehicle in the driving mode, each of the driving modes being associated with a set of driving sub-modes. Each driving sub-mode is adapted to be activated by the vehicle in response to ambient circumstances. One of the driving modes is associated with a first and a second driving sub-mode, the first and second driving sub-modes being accompanied with a first and a second driver controlled setting respectively. The system also includes an input device for selection between the driving modes and for controlling the driver controlled settings. The first and second driver controlled settings are adapted to be manually set by the driver through the input device only upon activation of the accompanying driving sub-mode by the vehicle.

20 Claims, 2 Drawing Sheets

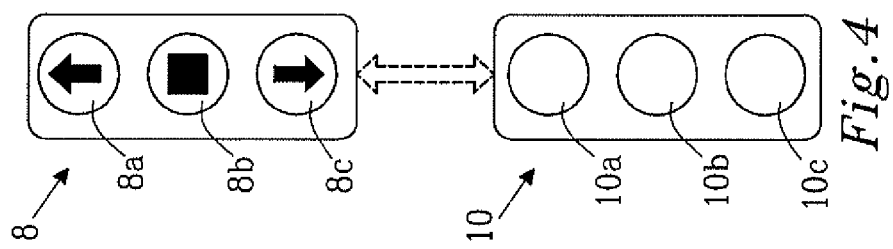
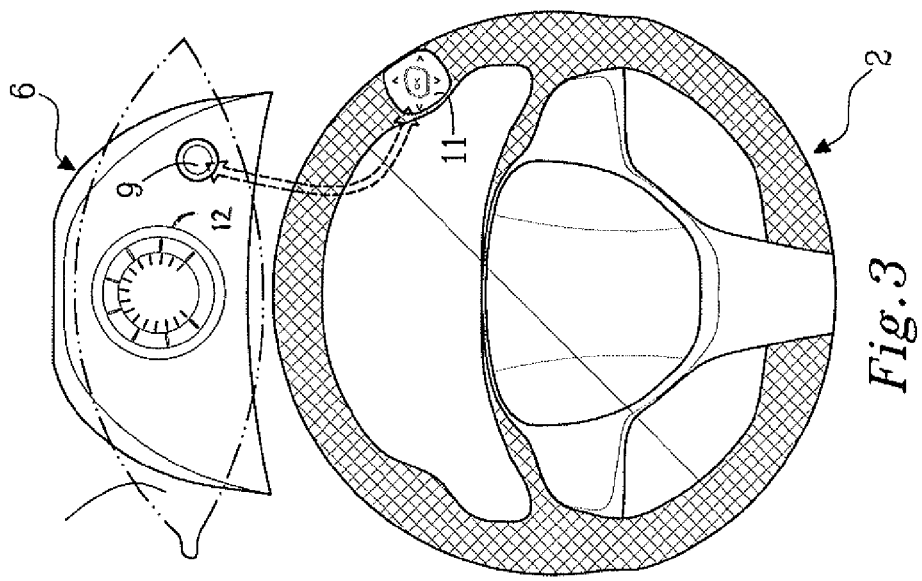
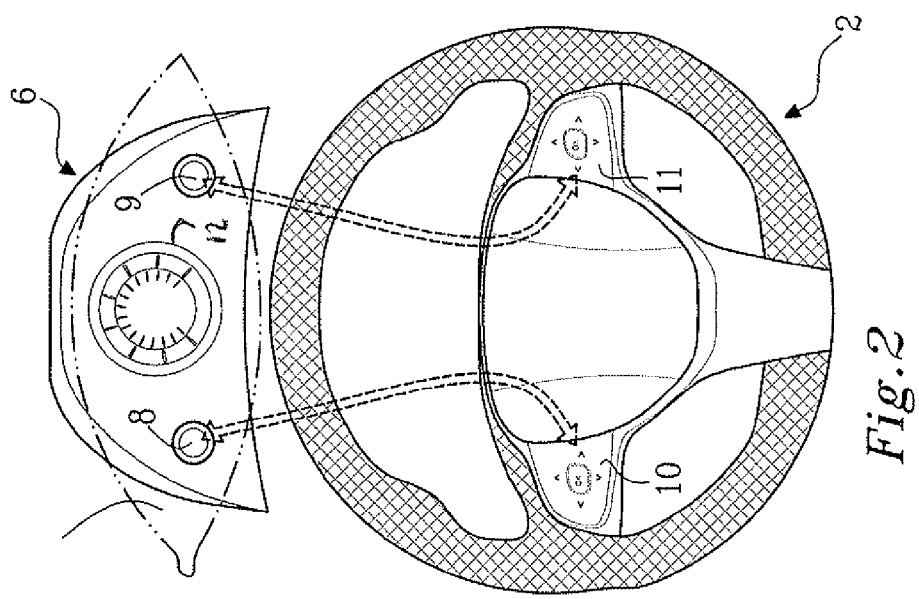

SYSTEM FOR CONTROLLING DRIVING MODES OF A VEHICLE

CROSS-REFERENCE TO RELATED APPLICATIONS

This application claims foreign priority benefits under 35 U.S.C. §119(a)-(d) to European patent application number EP 11194960.8, filed Dec. 21, 2011, which is incorporated by reference in its entirety.

TECHNICAL FIELD

The present disclosure relates to a system for controlling driving modes of a vehicle having a driver, wherein each of said driving modes is adapted to control a behaviour of said vehicle during operation of the vehicle in said driving mode, each of said driving modes being associated with a set of driving sub-modes, wherein each driving sub-mode is adapted to be activated by the vehicle in response to ambient circumstances.

BACKGROUND

In modern vehicles it has become important to give the driver of the vehicle a personalised driving experience and the possibility to control various functions of the vehicle through i.a. input buttons, joysticks or knobs. The more control functions the vehicle is provided with, the more input buttons and/or input menus are present in the vehicle. The design of these input buttons and input menus is vital for a positive driving experience and is a task that involves the question of how the driver perceives matters like symbols and grouping of buttons in order to make the interface intuitive.

One trend is to collect and to display the most vital information in and around the driver's line of sight to help the driver keep his or her sight and focus on the road ahead of the vehicle as opposed to have to look down to search for a certain menu or display. Some vehicles have even been provided with parts of the displayed information being put on display on the windscreen, a so called Head-up display. Less important and more seldom used items may be placed further away from the line of sight, such as on a centre column between the front seats. Input buttons, joysticks or knobs may also be provided on said centre column or on or around the front door handles.

An often used location for input buttons or similar is on the steering wheel or in close proximity of the steering wheel, where the driver mostly holds the hands during driving. The reason being to help the driver to maintain driving safety by keeping the hands on the steering wheel, or at least not forcing him or her to unnecessarily remove them from the steering wheel. It has been a trend to locate a rather large number of dedicated buttons on either side of the steering wheel, each button showing a fixed symbol. The symbols may seem illustrative and simple to understand for a designer of such prior art systems, but for someone who is not driving the car on a regular basis it may be found difficult to remember the functionality. The full functionality of the vehicle may consequently not be used, or safety is lowered when searching for the proper button.

One prior art system is disclosed in WO 01/60650 A1. Here a large number of buttons are located on either side of the steering wheel, each button corresponding to a button on the display of the dashboard. The dashboard display discloses a symbol for each button disclosing the functionality thereof in order to improve driving safety by not forcing the driver to look down on the steering wheel buttons to search for the desired button.

It is an object of the embodiments disclosed herein to further improve the driver's ease of use of the different functions that are involved in controlling the vehicle in order to maintain, or even improve, driving safety.

SUMMARY

This and other objects of the embodiments disclosed herein will become clear and the advantages will become apparent from the following description together with the appended claims and drawings.

According to a first aspect of the embodiments disclosed, a system for controlling driving modes of a vehicle having a driver is disclosed, wherein each of said driving modes is adapted to control a behaviour of said vehicle during operation of the vehicle in said driving mode, each of said driving modes being associated with a set of driving sub-modes, wherein each driving sub-mode is adapted to be activated by the vehicle in response to ambient circumstances, wherein one of said driving modes is associated with a first and a second driving sub-mode, said first and second driving sub-modes being accompanied with a first and a second driver controlled setting respectively, said system further comprising input means for selection between said driving modes and for controlling said driver controlled settings when applicable, wherein said first and second driver controlled settings are adapted to be manually set by the driver through said input means only upon activation of the accompanying driving sub-mode by the vehicle.

When a driving mode in a vehicle is associated with at least a first and a second driving sub-modes and each of the first and second sub-modes is accompanied with a first and a second driver controlled setting respectively, the setting of the driver controlled settings may be done only upon activation of the accompanying driving sub-mode by the vehicle itself. In general, certain, but not necessarily all sub-modes have a default driver controlled setting which may be set upon manufacture of the vehicle. This default set driver controlled setting may be desired to be maintained by the driver, but may also be desired to be altered. Also, in the event that the driver controlled setting does not have a default setting, the driver must necessarily set the driver controlled setting. By the inventive system the drivers attention is called upon only when the driver controlled setting is about to be used by the system which is when the vehicle activates the accompanying driving sub-mode. Such a situation may occur i.a. when the vehicle is set to drive according to the driving mode in question in which said first driving sub-mode is running until ambient conditions requires said second driving sub-mode is activated by the vehicle and possibly by a set of conditions set in e.g. a vehicle computer. This results in the safety improving advantage that the attention of the driver is only called upon when this activation is under way. Also, a major advantage lies in the easy handling of the system as such, since there is no need for extensive fiddling with the input means for the driver. Furthermore, the driver does not run the disadvantage of getting lost in lower levels of sub-modes to find a system location for setting a driver controlled setting. The system is thus designed to help and to guide the driver through the driving modes to find the desired one and to, when applicable, set the desired driver controlled setting of the driving sub-mode in question.

According to an embodiment disclosed herein the input means is adapted both to set each driver controlled setting and to manually move stepwise within said driver controlled setting. This improves the ease of handling of the system such that the driver does not need to look for a separate input means.

According to an embodiment disclosed herein each one of said driving sub-modes is accompanied with a single driver controlled setting.

According to an embodiment disclosed herein said first driving sub-mode is a cruise control mode, and said second driving sub-mode is a minimum driving distance mode.

According to an embodiment disclosed herein said input means includes a single selection/setting soft key. This improves the ease of handling of the system such that the driver does not need to look for a separate set of selection/setting soft key.

According to an embodiment disclosed herein each input means is a soft key arrangement comprising five soft keys. Hereby input means are designed to be diversified in usability while maintaining ease of handling.

According to an embodiment disclosed herein four of said soft keys are arranged equidistantly along a circle and one soft key is arranged centrally as seen in relation to said circle. Thereby the driver will learn to easily find the desired soft key without removing focus from the driving of the vehicle.

According to an embodiment disclosed herein said four soft keys are touch keys and said one centrally located soft key is a depressible button. This gives the driver a tactile feedback of the interrelationship between the different keys and may locate a finger's location without looking at the input means.

According to an embodiment disclosed herein changing driving mode is adapted to be performed by manually stepping between driving modes using horizontally located soft keys, and in which changing driving sub-mode is adapted to be performed by manually stepping between driving sub-modes using vertically located soft keys. This is an analogous method of selecting which may be recognised from items in the everyday life of the driver, such as from a music apparatus or computerised item. Again, the driver's intuitive perception of the system as such and the handling thereof is improved.

According to a second aspect of the disclosed embodiments a vehicle is disclosed which is provided with a system according to any one of the preceding embodiments. Such a vehicle maintains the advantages as discussed above in relation to the system for controlling driving modes of a vehicle having a driver.

According to a third aspect of the disclosed embodiments a system for controlling driving modes of a vehicle having a driver is disclosed, wherein each of said driving modes is adapted to control a behaviour of said vehicle during operation of the vehicle in said driving mode, each of said driving modes being associated with a set of driving sub-modes, wherein each driving sub-mode is adapted to be activated by the vehicle in response to ambient circumstances, wherein one of said driving modes is associated with a first and a second driving sub-mode, said first and second driving sub-modes being accompanied with a first and a second driver controlled setting respectively, said system further comprising input means having a set of soft keys for selection between said driving modes and for controlling said driver controlled settings when applicable, in which changing driving mode is adapted to be performed by manually stepping between driving modes using horizontally located soft keys, and in which changing driving sub-mode is adapted to be performed by manually stepping between driving sub-modes using vertically located soft keys. This is an analogous method of selecting a driving mode and/or a driving sub-mode which may be recognised from items in the everyday life of the driver, such as from a music apparatus or computerised item. Again, the driver's intuitive perception of the system as such and the handling thereof is improved.

BRIEF DESCRIPTION OF THE DRAWINGS

Various embodiments will now be described in more detail with reference to embodiments and the appended figures. In the figures FIG. 1. shows a schematic representation of a driver environment in a vehicle having a system according to one embodiment disclosed, FIG. 2 shows a schematic representation of a steering wheel and a dashboard being provided with the embodiment of FIG. 1, FIG. 3 shows a schematic representation of a steering wheel and a dashboard being provided with another embodiment of the system disclosed, and FIG. 4 shows a schematic representation of a key arrangement according to a further embodiment of the system disclosed.

DETAILED DESCRIPTION

Figure 1:
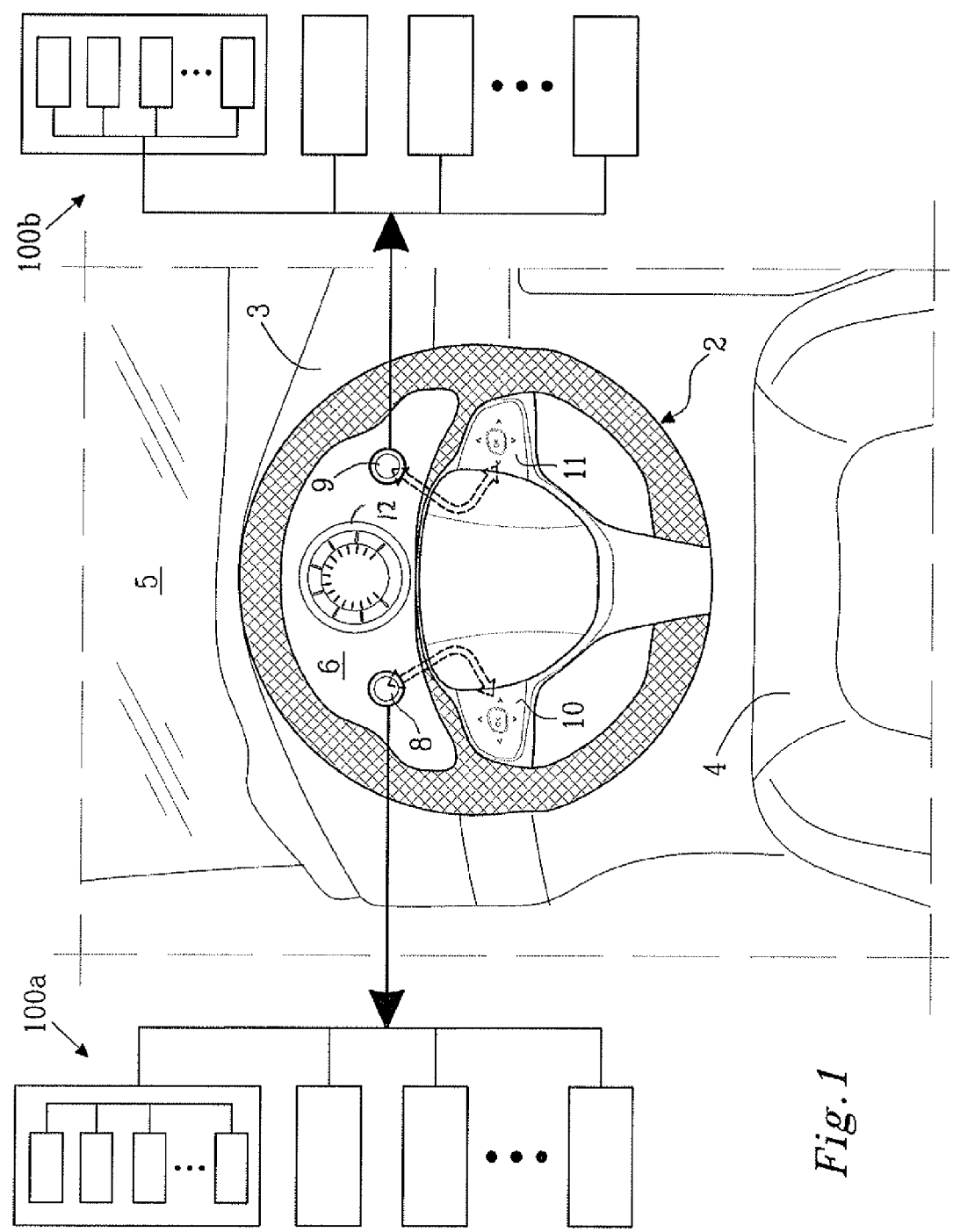

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The present disclosure relates to a system for controlling driving modes of a vehicle 1 having a driver. One vehicle 1 having such a system is disclosed in FIG. 1. More specifically the present disclosure relates to a system that controls certain functions in the vehicle 1 on demand from the driver of the vehicle 1. Such functions may be the use and control of different types of cruise control systems, lane keeping systems, lane departure warning systems or other systems or features relevant to the vehicle 1 and/or to the driver. The functions that are controlled by the inventive system are not in themselves material for this patent application, but merely exemplary functions and other may well be included in the system without deviating from the scope.

A vehicle 1 may be any type of vehicle 1 having a driver controlled control system. Such vehicles 1 may include cars, lorries or trucks, vans, motor cycles, tractors or caterpillars, or the like.

In and throughout this application words such as vertical, horizontal, left and right will be given their normal meaning as seen from a driver's point of view when sitting in a driver's seat of the vehicle 1.

In the following, a driver controlled control system in a vehicle 1 will be described in more detail, which driver controlled control system may be used together with the inventive system. Other driver controlled control systems may be used with the present disclosure as long as the system fulfills the requirements as set by the claims.

The vehicle 1 in FIG. 1 comprises a steering wheel 2 in front of a dashboard 3, which dashboard 3 is at least to a certain extent visible to a driver driving the vehicle 1. The driver (not shown) is seated in a driver's seat 4 and looking out on a road through a windscreen 5. The driver has a normal line of sight which runs from his or her eyes above the steering wheel 2 and the dashboard 4 through the windscreen 5 and to the road ahead of the vehicle 1. On the dashboard 3 there is a display screen 6 which is visible through the steering wheel 2. The display screen 6 may be an analogue display, a digital display or a combination thereof. The display screen 6 may show a speedometer, a tachometer, a meter showing the level of fuel remaining in the fuel tank and one showing the temperature of the engine. Other meters or information displays may be shown which are well known in the art. Generally, the most vital information is put on display in the centre.

The display screen 6 has two display portions 8, 9 which are located on either side of a central part 12 of the display screen 6, here shown as a central circle 12. The steering wheel 2 is provided with two key pads 10, 11, one on either side of a centre of the steering wheel 2. The key pad 10 on the left hand side of the steering wheel 2 is connected to the display portion 8 on the left hand side of the display screen 6. Similarly, the key pad 11 on the right hand side of the steering wheel 2 is connected to the display portion 9 on the right hand side of the central part 12 of the display screen 6. These connections are indicated in FIG. 1 by arrows in broken lines. The key pads 10, 11 are one embodiment of input means or a soft key arrangement 10, 11 according to the claims. The display portions 8, 9 are one embodiment of a display key arrangement 8, 9 according to the claims.

Each key pad 10, 11 includes 5 (five) positions, which each one is an input device for the inventive system. Each input device is a so called soft key. By touching one of the 5 input devices, the driver may change between different functions that are associated with the vehicle 1, and may choose between options that are available for selection for each function. Each input device is marked with a generic symbol. Both key pads 10, 11 have a centre input device in the form of a depressible button marked with the text "OK". This centre input device is one embodiment of a single selection/setting key according to the claims. Around this centre input device the remaining 4 (four) input devices are located at equal mutual distances as if they were located on a circle. One is located vertically above, and one located vertically below said centre input device, and one is located horizontally to the left, and one is located horizontally to the right as seen in relation to said centre input device. These 4 input devices are also depressible buttons, but they are formed in one piece with the surface of the key pads 10, 11 such that the driver does not feel any button edges, but rather a dent in the middle of each input device for tactile feedback. Each of the 4 input devices is marked with an arrow. The upper input device is marked with an arrow pointing upwards, the lower one with an arrow pointing downwards, the left hand sided one with an arrow pointing to the left, and the right hand sided one with an arrow pointing to the right. The input devices of said key pads 10, 11 are one embodiment of a soft key according to the claims.

The term soft key is in and throughout this application used for a key which may be given different meaning when actuated at different situations, depending on the current mode of operation of the system and/or the vehicle 1. The current meaning of the soft key is shown in its corresponding display position. It is hence noted that the term is not used for a key being soft or having in some meaning a "soft" behaviour.

Each display portion 8, 9 includes 5 (five) positions, which each one shows an available option for said position which is selectable for the driver. It may be that one or several of said display positions is switched off if there are less than 5 available options for selection at that particular moment. Both display portions 8, 9 have a centre display position. Around this centre display position are the remaining 4 (four) display positions located at equal mutual distances, as if they were located on a circle. One is located vertically above, and one located vertically below said centre display position, and one is located horizontally to the left, and one is located horizontally to the right as seen in relation to said centre display position.

Each display portion 8, 9 may be seen as having a certain layout for each function, in which each layout includes the five display positions shown. It is noted that in order to make the layouts of the display portions 8, 9 graphically appealable, easily readable and intuitive to the driver, the design of the layouts is not limited to exactly the same design of the key pads 10, 11 and their respective input devices. The layouts may however, as long as the general outlay is similar, use the area in and around each display portion 8, 9 in a more free way, such as making symbols larger than its corresponding input device or going outside of the area corresponding to the general shape of each key pad etc.

Due to the connections between e.g. the left hand sided key pad 10 and the left hand sided display portion 8, the upper input device of the key pad 10 corresponds to the upper display position on the display portion 8, such that a depression of said input device effects the option currently displayed by said display position. Corresponding connections for the other interconnected input devices and display positions result in corresponding effects. This results in a much diversified usability of the system. The system may be programmed to include almost any number of functions which are to be controlled by the system, and for each function the options available for selection by the driver through each key pad 10, 11 and their respective input devices may be shown on the corresponding display portions 8, 9 and their respective display positions. These functions will be further discussed below.

The central part 12 of the display screen 6 shows in this embodiment a circular fully digital colour display. The display screen 6 incorporates both said central part 12 and the two display portion 8, 9 into one single large digital display. It is consequently possible for the vehicle and/or system manufacturer to also display information to the driver at other locations on said display screen 6. The central part 12 is provided with a circular outer ring showing a tachometer. At the bottom of said central part 12 and overlying said tachometer is the current vehicle speed shown. Within the circular outer ring a circular area is formed which is used to further enhance the information shown in connection with the inventive system. If the driver actuates one of the key pads 10, 11 and the corresponding display portion 8, 9 consequently displays the currently available options, this may be further emphasised by putting the same or other related information on display within this ring. This ring may e.g. show a GPS road map, the currently broadcasted radio station, the name of and a possible image showing who is making an incoming telephone call, the speed set in a cruise control system etc. This central part 12 of the display screen 6 is nevertheless not necessary for the system.

Now we turn to the functionality of the system. The system is designed to manage and control a number of functions that are included in the vehicle 1, either as hardware or software. The function of the vehicle 1 is thus controlled by a corresponding mode of the driver controlled control system. The words function and mode are used interchangeably in this application.

In general terms the vehicle 1 is provided with two sets of function modes: one set of function modes is an infotainment function mode and the other one is a driving function mode. The driving function mode is one embodiment of a driving mode according to the claims.

The word infotainment will in and throughout the present application be used to comprise matters such as information systems, music, radio and internet related matters, positioning systems such as the Global Positioning System (GPS), mobile telephone and message systems such as Short Message System (SMS), connections to other media players etc. Infotainment function modes thus includes a mode in which the vehicle 1 is connected to a mobile telephone of the driver and displays matters such as incoming calls, incoming SMS messages and shows a contact list if and when the driver him or herself initiates a telephone call. In another infotainment mode the system may be showing a radio channel presently broadcasting through the vehicle loudspeakers and the driver may i.a. change loudspeaker volume or change radio channel. A further infotainment mode may be a GPS mode in which the system may show different destinations between which the driver may choose, or the driver may through i.a. alphabetical input means (not shown), such as a keypad, soft keys or any other input device, tick in a destination of own choice. Other infotainment modes may be an Internet mode in which the driver may, through i.a. alphabetical input means, tick in a web page of own choice which the system displays on e.g. the display screen 6.

Driving function modes for the vehicle 1 may include functions such as manual driving in which the driver self is in total control of the driving behaviour of the vehicle, a fixed cruise control driving mode in which the driver sets a speed which the vehicle is trying to keep within certain tolerance limits and as long as the prevailing driving conditions allows such driving, an adaptive cruise control mode, in which e.g. the vehicle 1 is controlled by both of a set speed limit and by a minimum driving distance to a lead vehicle depending on prevailing conditions and the accompanying settings set, and other more or less manual or automatic driving modes. The contents and the default settings of these driving function modes may either be preset by the vehicle 1 or by the system manufacturer, or defined by the driver through input means in the vehicle 1. A fixed cruise control mode and an adaptive cruise control mode are each one an embodiment of a driving mode according to the claims.

Each driving function mode is accompanied with a set of driving sub-modes. In the exemplified adaptive cruise control mode one driving sub-mode is the set speed limit and one is the minimum driving distance to a lead vehicle. The set speed limit is one embodiment of a first driving sub-mode according to the claims and the minimum driving distance to a lead vehicle is one embodiment of a second driving sub-mode according to the claims.

The set speed limit sub-mode is accompanied by a manually set set speed, which is set by the driver upon i.e. initiation if the driving mode. Such a set speed is one embodiment of a first driver controlled setting according to the claims. The minimum driving distance sub-mode is accompanied by a manually set minimum distance, which is set by the driver upon i.e. initiation of the driving mode. Such a minimum distance is one embodiment of a second driver controlled setting according to the claims. The setting by the driver of these driver controlled settings will be further discussed below.

Other driving function modes and driving sub-modes lie within the scope of the disclosure. It is also possible for a driving mode to comprise more than one or two driving sub-modes as have been discussed above. There is no theoretical upper limit for the number of driving sub-modes associated with each driving mode, and the number of driving sub-modes may be different between different driving modes. There is also no theoretical upper limit to the number of driving modes in a vehicle 1, but there is in practice an upper limit related to the efficiency of the system and the handling for the driver. Furthermore, it is not necessary for a driving sub-mode to be accompanied by a driver controlled setting other than what is required by the claims.

The function modes are grouped into the two sets of function modes in order to help and guide the driver of the vehicle 1 to easily and intuitively find the correct key arrangement 8, 10; 9, 11 for controlling the desired function of the vehicle 1. There is a logical link between the function modes within each set of function modes so that each set forms a group of related subjects.

Turning again to FIG. 1, the above discussed two sets of function modes are denoted 100*a* and 100*b*. The driving function mode 100*a* is controlled by the left hand key arrangement 8, 10 and the infotainment function mode 100*b* is controlled by the right hand key arrangement 9, 11. This division will be apparent from the display portions 8, 9, but may also be easily remembered by the driver after having seen it just a few times. Each set of function modes 100*a*, 100*b* is illustrated in FIG. 1 each one as a set of main menus and corresponding sub-menus. These main menus are in the present inventive system designed as the above described layouts for each function mode and showing currently available selectable function modes. The sub-menus consequently correspond to the currently available selectable options for each function mode. In other words, each main menu represents a function mode and each sub-menu represents an option.

During driving the driver may start the vehicle by driving it manually using the hands and feet on the steering wheel 2, and the acceleration pedal (not shown). Now the system is keeping the vehicle 1 in a first driving function mode. The driver may want to listen to the radio and may do so by depressing either the right hand sided or the left hand sided input device on the right hand sided key pad 11 of the steering wheel 2. Hereby the driver changes between available infotainment function modes and this is made clear through corresponding changes between layouts on the right hand side display portion 9. When finding the radio mode, the driver confirms the choice by depressing the centre input device marked "OK" on the right hand side key pad 11. All of these choices are normally made using the right hand side thumb. When the "OK" button has been actuated, the corresponding layout, or sub-menu, is shown in the right hand side display portion 9. The next step is to make a radio station selection. The currently displayed layout is designed to highlight the upper and lower display positions of the right hand side display portion 9 so that the driver easily understands that by depressing either the upper or lower input device on the right hand side key pad 11, he or she may jump between a pre-programmed selection of radio stations. When the driver has found the radio station of choice, he or she stops depressing the input devices, and within a few seconds the chosen radio station is put on the loudspeakers of the vehicle 1 by the system. Now the currently displayed layout is instead displaying the options of changing the volume of the loudspeakers up or down by highlighting again the upper and lower display positions corresponding to the upper and lower input devices of the right hand side key pad 11. During these different phases the central part 12 of the display screen 6 is further emphasising certain parts of the choices at hand. At the point of final selection, the central part 12 may e.g. disclose the currently broadcasted radio program or piece of music, text advertisements or similar information if such is accompanying the radio signal. It is noted that the selection of infotainment function mode is made through the "OK"-button, and stepping through the available selectable infotainment function modes is made through stepping by using either or both of left and right hand sided input device. The changing of radio station or volume is made through stepping by using either or both of up and down input devices.

If the driver would like to use a cruise control mode, he or she may select between the available driving function modes by depressing either the right hand sided or the left hand sided input device in the left hand sided key pad 10 corresponding to the right hand sided or left hand sided display positions of the left hand sided display portion 8. The layout of the left hand side display portion 8 changes correspondingly. When finding the desired cruise control driving mode, the driver makes this choice and simultaneously sets the current speed as the set speed for the cruise control system by depressing the centre input devise marked "OK" on the left hand side key pad 10. This is a second driving function mode. The current layout of the left hand side display portion 8 now displays the options of increasing or decreasing the set speed by highlighting the upper and lower input devices on the left hand side display portion 8. If during cruise controlled driving, the driver needs to change gear or to break, the cruise control system is put on hold until the driver confirms continued cruise controlled driving by again depressing the centre input devise. All of this is displayed in the left hand side display portion 8. During the "hold-phase" of this driving mode, this is displayed in the display portion 8 at the centre display position. During these different phases the central part 12 of the display screen 6 is further emphasising certain parts of the choices at hand. At the point of final selection the central part 12 may e.g. disclose the speed set by the cruise control system.

If the desired and chosen cruise control driving mode discussed above also includes a driving sub-mode defined by a minimum driving distance, it is likely that the vehicle 1 is cruising according to the driving sub-mode accompanied with a set speed, i.e. that the driver is selecting a driving function mode during a cruise phase. Then, according to this embodiment, the set speed is set upon activation of the associated driving function mode. The vehicle 1 is consequently cruising according to the set speed, until a lead vehicle is run up and the driving sub-mode of minimum driving distance is activated according to rules set by e.g. a vehicle computer. Upon activation of the minimum driving distance a default value on minimum distance may have been set by the vehicle manufacturer. However, according to this embodiment the vehicle 1 allows the driver to manually set a minimum distance of own choice. The driver is allowed to set this minimum distance upon automatic activation of the driving sub-mode, i.e. of the minimum driving distance, by the vehicle 1. This means that the driver cannot manually activate a setting of the minimum distance.

The situation may naturally also occur that the driver is setting the cruise control driving mode at a time when the vehicle 1 is running at a distance to a lead vehicle which lies within a distance range that is controlled by the minimum driving distance sub-mode, i.e. which is less than the currently set minimum distance. Then the setting of the minimum distance may be done upon activation of this driving function mode. The default value set may be altered or re-set by the driver when driving at a distance to the lead vehicle which is desired as a new minimum distance, or be adjusted by the driver through stepping either up or down using the input devices associated with the corresponding action for the input means. When the vehicle 1 is no longer within the driving range of the lead vehicle it automatically activates the cruise control sub-mode and the system asks the driver to set a set speed with which the set speed driving sub-mode is accompanied.

The inventive system may be set wrongly by the driver of the vehicle 1. For instance the driver may choose the wrong or an unwanted driving function mode. In such a case the vehicle 1 runs according to the settings of this driving function mode until the driver selects a new, and possibly desired, driving function mode. In order to change the wrongly set driving function mode, the driver may manually again step through the available driving function modes by using either or both of left and left hand sided input device. By depressing the "OK"-button, the selection is made and the vehicle 1 should run according to the desired driving function mode.

It is noted that the inventive system is designed such that a "Back"-button or "Escape"-button is not needed.

The system may be programmed to comprise any overseeable number of function modes in each set of function modes. Also, the corresponding sub-menus or layouts may be programmed to comprise any oversee-able number thereof. The only system related limitation is the number of currently available options that are limited to the number of input devices on each key pad 10, 11 in the vehicle 1.

In FIG. 2 a schematical illustration discloses a system according to the disclosure which to a large extent is similar to the embodiment of FIG. 1. However, in this particular embodiment there is no central part of the display screen 6. At least not anyone that displays information related to the inventive system. The embodiment is otherwise similar to the earlier described embodiment and the reader is asked to turn to the description of FIG. 1 for more details on the system. Items in FIG. 2 have been given the same reference numeral as in FIG. 1 when the item in function and design is similar. Any items left out in FIG. 2 is merely for space saving reasons and not intended to imply any difference to the earlier embodiment.

In FIG. 2 the focus of the drivers attention is implied by a broken line marked 50 in the form of an eye. The focus is on the road ahead of the vehicle and, when necessary, on the display screen 6 where the most often needed pieces of vital information is collected. It is emphasised that in all embodiments disclosed it is the intention that the driver does not need to lower his or her sight down to have to look at the respective key pads 10, 11 on the steering wheel 2 in order to get information on what keys to press to activate the different function modes.

In FIG. 3 an embodiment of the present disclosure is schematically illustrated in which there is only one display portion 9. In this particular embodiment the only display portion 9 is located on the right hand side of the display screen 6 and its central part 12, but it could instead have been located on the left hand side thereof. In a corresponding location on the steering wheel 2 a corresponding key pad 11 is located. In this embodiment the key pad 11 is located, not towards the centre of the steering wheel 2, but along its periphery. Still the object is to give easy access to the key pad 11 by the driver's thumb without losing sight of the road ahead. Again a broken line 50 implies the focus of the driver's attention on the display screen 6. In this embodiment there is only one set of function modes controlling the functions of the vehicle 1. There is hence no possibility to group the function modes into different sets of function modes such that different key arrangements 8, 10; 9, 11 are adapted to control the different sets. On the other hand, the function modes may still be grouped, using a similar grouping idea as earlier described, such that one sets of function modes is followed by another set of function modes, and so on, so that the driver anyway gets at least some intuitive feel for when a function of choice is appearing.

FIG. 4 shows a schematical representation of a display portion 8 having only 3 (three) display positions 8a, 8b, 8c, and a corresponding key pad 10 having the corresponding 3 (three) input devices 10a, 10b, 10c. Here the input devices 10a, 10b, 10c and hence the display positions 8a, 8b, 8c are located in a vertical row, but any relative location may be used as long as the relative location correspond at least to a certain extent between the key pad 10 and the display portion 8. The input devices 10a, 10b, 10c are in this embodiment all of the type of depressible buttons. According to this embodiment the driver may use two input devices to step between the different driving modes of the vehicle 1, and set the selection by the third input device, but not manually increase or decrease the set driving controlled setting accompanying the driving sub-menu associated with the selected driving mode. Hence, according to this embodiment, the driver may only set a driving controlled setting when e.g. in a position desired for minimum driving distance or at a speed which is desired for set speed.

Again the focus of the driver's sight is emphasised to be upon the display portion 8 by a broken line 50 in the form of an eye. In this embodiment it is not shown where in the vehicle 1 the key arrangement 8, 10 is located. The display portion 10 should be located anywhere in the proximity of the dashboard 3 of the vehicle 1, such as somewhere on the display screen 6 as in earlier embodiments, but also as or as well as a so called Head-up display on the windscreen 5. This is particularly suitable when the focus of the driver's attention must be on the road ahead of the vehicle 1. The key pad 10 should be located anywhere in the proximity of the steering wheel 2 of the vehicle 1, such as on knobs around the steering wheel 2 or possibly at a door handle of the vehicle 1 as long as the key pad 10 is within easy and direct reach of the steering wheel 2 and without forcing the driver to remove his or her sight from the road.

The embodiment of FIG. 4 is illustrated using the key arrangement 8, 10, but could just as well have been illustrated by the key arrangement 9, 11. It is most convenient if the display portion 8 is located in a similar position in relation to the driver as the corresponding key pad 10, but in this embodiment that is not as needed as in earlier described embodiments.

The present disclosure is not limited to the embodiments disclosed and described above. Rather, a number of alterations may be made without deferring from the scope as defined by the claims. Such alterations may include embodiments in which there is no centrally located display part 12 used in combination with the inventive system. Any display of information, such as the display portions 8, 10 may be used only or in combination with other means of display on a so called Head-up display on the wind screen 5. The display portions 8, 10 may optionally be followed by sound feedback to the driver when changing between different function modes or different sets of function modes. Other soft key arrangements 10, 11 may include a joystick, a ball, a thumbwheel, a touch screen and not only may each soft key give the driver tactile feedback when placing a finger upon it, but may as well give sound feedback or visual feedback on the respective display key by highlighting the current display key. Furthermore, the soft keys within a soft key arrangement may have different design and give different feedback when touching it. One soft key may have a raised middle part, whereas another soft key within the same soft key arrangement may have a raised edge. The embodiments so far described have had either one or two key arrangements. It is contemplated that further key arrangements may be included in the system corresponding to and controlling an equal number of sets of function modes. One such added set of function modes may e.g. be the control of windscreen vipers, another control of an air conditioning system etc.

The present disclosure is further contemplated to be described as a system for controlling driving modes of a vehicle having a driver, wherein each of said driving modes is adapted to control a behaviour of said vehicle during operation of the vehicle in said driving mode, each of said driving modes being associated with a set of driving sub-modes, wherein each driving sub-mode is adapted to be activated by the vehicle in response to ambient circumstances, wherein one of said driving modes is associated with a first and a second driving sub-mode, said first and second driving sub-modes being accompanied with a first and a second driver controlled setting respectively, said system further comprising input means having a set of soft keys for selection between said driving modes and for controlling said driver controlled settings when applicable, in which changing driving mode is adapted to be performed by manually stepping between driving modes using horizontally located soft keys, and in which changing driving sub-mode is adapted to be performed by manually stepping between driving sub-modes using vertically located soft keys.

Finally, it is contemplated to rearrange the driving sub-modes such that one driving sub-mode comprises more than one driver controlled setting. One such example could be to include both a fixed cruise control and a minimum driving distance within one and the same driving sub-mode. In such a case one driving sub-mode is accompanied with two driver controlled settings. This would imply that the scope of the appended claims could be circumvented only by such a rearrangement. However, the mere rearrangement of the driving function modes and/or the driving sub-modes into a different grouping does not yield any functional difference and hence should be recognized as included in the scope of the appended claims While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for controlling driving modes of a vehicle having a driver, wherein each of said driving modes is adapted to control a behaviour of said vehicle during operation of the vehicle in said driving mode, each of said driving modes being associated with a set of driving sub-modes, wherein each driving sub-mode is adapted to be activated by the vehicle in response to ambient circumstances, wherein one of said driving modes is associated with a first and a second driving sub-mode, said first and second driving sub-modes being accompanied with a first and a second driver controlled setting respectively, said system comprising:
   a display for displaying information associated with said driving modes, driving sub-modes and/or driver controlled settings; and
   input means for selection between said driving modes and for controlling said driver controlled settings when applicable, wherein said first and second driver controlled settings are adapted to be manually set by the driver through said input means only upon activation of the accompanying driving sub-mode by the vehicle.

2. A system for controlling driving modes according to claim 1, wherein the input means is adapted both to set each driver controlled setting and to manually move stepwise within said driver controlled setting.

3. A system for controlling driving modes according to claim 2, wherein said input means is a soft key arrangement comprising five soft keys.

4. A system for controlling driving modes according to claim 1, wherein each one of said driving sub-modes is accompanied with a single driver controlled setting.

5. A system for controlling driving modes according to claim 4, wherein said input means is a soft key arrangement comprising five soft keys.

6. A system for controlling driving modes according to claim 1, wherein said first driving sub-mode is a cruise control mode, and said second driving sub-mode is a minimum driving distance mode.

7. A system for controlling driving modes according to claim 6, wherein said input means is a soft key arrangement comprising five soft keys.

8. A system for controlling driving modes according to claim 1, wherein said input means includes a single selection/setting soft key.

9. A system for controlling driving modes according to claim 8, wherein said input means is a soft key arrangement comprising five soft keys.

10. A system for controlling driving modes according to claim 1, wherein said input means is a soft key arrangement comprising five soft keys.

11. A system for controlling driving modes according to claim 10, in which four of said soft keys are arranged equidistantly along a circle and one soft key is arranged centrally as seen in relation to said circle.

12. A system for controlling driving modes according to claim 11, wherein said four soft keys are touch keys and said one centrally located soft key is a depressible button.

13. A system for controlling driving modes according to claim 12, in which changing driving mode is adapted to be performed by manually stepping between driving modes using horizontally located soft keys, and in which changing driving sub-mode is adapted to be performed by manually stepping between driving sub-modes using vertically located soft keys.

14. A system for controlling driving modes according to claim 11, in which changing driving mode is adapted to be performed by manually stepping between driving modes using horizontally located soft keys, and in which changing driving sub-mode is adapted to be performed by manually stepping between driving sub-modes using vertically located soft keys.

15. A vehicle having a system for controlling driving modes, wherein each of said driving modes is adapted to control a behaviour of said vehicle during operation of the vehicle in said driving mode, each of said driving modes being associated with a set of driving sub-modes, wherein each driving sub-mode is adapted to be activated by the vehicle in response to ambient circumstances, wherein one of said driving modes is associated with a first and a second driving sub-mode, said first and second driving sub-modes being accompanied with a first and a second driver controlled setting respectively, the vehicle comprising:
  a display for displaying information associated with said driving modes, driving sub-modes and/or driver controlled settings; and
  input means for selecting between said driving modes and for controlling said driver controlled settings when applicable, wherein said first and second driver controlled settings are adapted to be manually set by a driver through said input means only upon activation of the accompanying driving sub-mode by the vehicle.

16. A system for controlling driving modes of a vehicle, wherein each of said driving modes is adapted to control a behaviour of said vehicle during operation in said driving mode, each of said driving modes being associated with a set of driving sub-modes, wherein each driving sub-mode is adapted to be activated by the vehicle in response to ambient circumstances, wherein one of said driving modes is associated with a first and a second driving sub-mode, said first and second driving sub-modes being accompanied with a first and a second driver controlled setting respectively, said system comprising:
  a display for displaying information associated with said driving modes, driving sub-modes and/or driver controlled settings; and
  an input device for selection between said driving modes and for controlling said driver controlled settings when applicable, wherein said first and second driver controlled settings are adapted to be manually set by a driver through said input device only upon activation of the accompanying driving sub-mode by the vehicle.

17. A system for controlling driving modes according to claim 16, wherein the input device is adapted both to set each driver controlled setting and to manually move stepwise within said driver controlled setting.

18. A system for controlling driving modes according to claim 16, wherein each one of said driving sub-modes is accompanied with a single driver controlled setting.

19. A system for controlling driving modes according to claim 16, wherein said input device includes a selection/setting soft key.

20. A system for controlling driving modes according to claim 16, wherein said input device is a soft key arrangement comprising a plurality of soft keys.

* * * * *